Feb. 23, 1954   C. B. LANSING ET AL   2,670,238
VALVE CONTROLLED COATING MATERIAL HEATING UNIT
Filed May 22, 1950   2 Sheets-Sheet 1
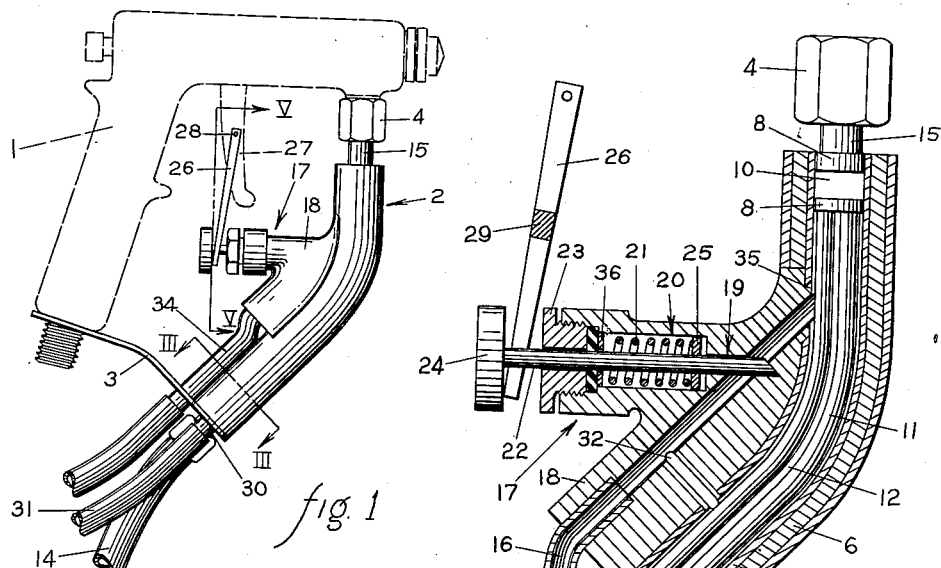
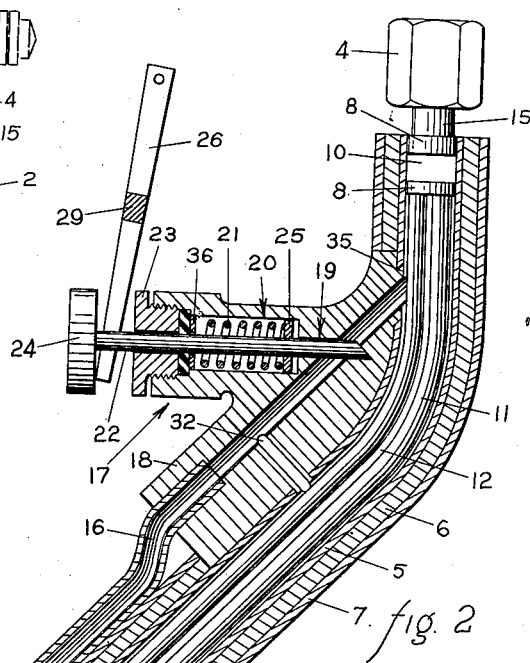
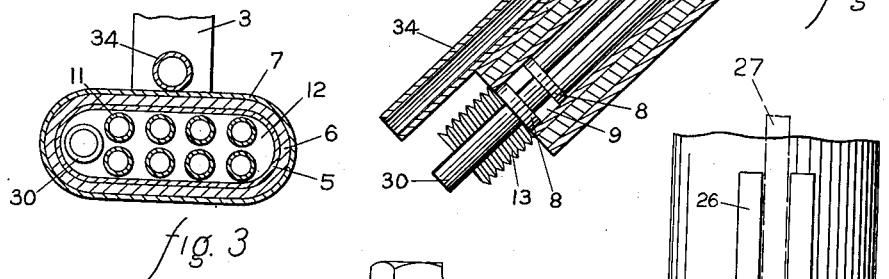
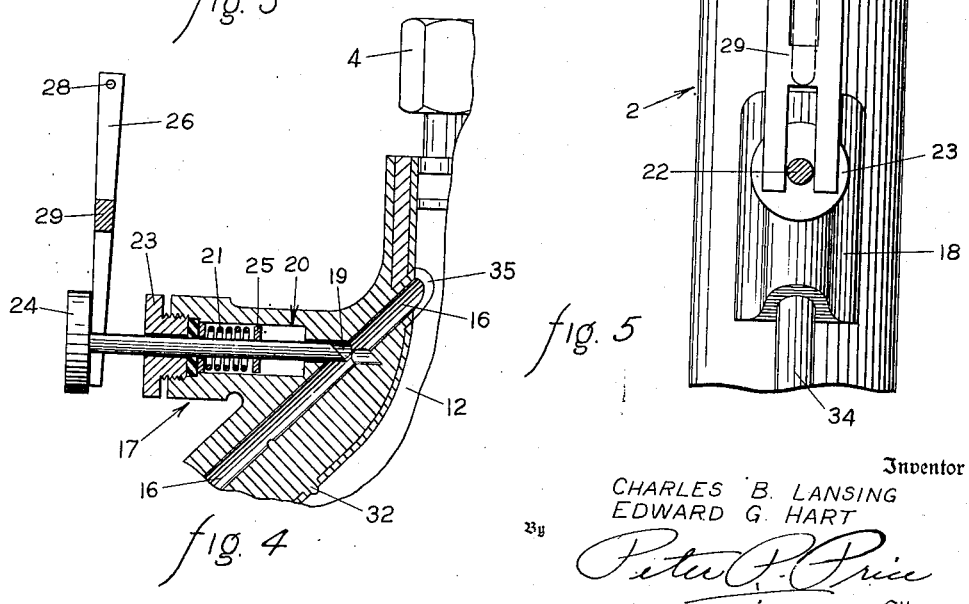
Inventor
CHARLES B. LANSING
EDWARD G. HART
By Peter P. Price
Attorney Feb. 23, 1954

C. B. LANSING ET AL 2,670,238

VALVE CONTROLLED COATING MATERIAL HEATING UNIT

Filed May 22, 1950

Inventor
CHARLES B. LANSING
EDWARD G. HART

By Peter F. Price

Attorney

Patented Feb. 23, 1954

2,670,238

UNITED STATES PATENT OFFICE 2,670,238

VALVE CONTROLLED COATING MATERIAL HEATING UNIT

Charles B. Lansing and Edward G. Hart, Cleveland, Ohio, assignors to The Arco Company, Cleveland, Ohio, a corporation of Ohio Application May 22, 1950, Serial No. 163,512

8 Claims. (Cl. 299—86)

This invention relates to the heating of coating materials prior to spraying and more particularly to a coating material heating unit utilizing steam as its source of thermal energy and having a steam flow regulating mechanism.

Since low pressure steam provides a relatively low temperature heat source, capable of delivering a large volume of B. t. u.'s without creating a fire hazard with volatile solvents, it is the most desirable medium for heating heavily pigmented coating materials. A further important advantage of steam is the fact that the entire heating unit may be simple, light, compact and constructed entirely of parts and materials adapted to endure long, rough usage. The temperature of the coating material must not exceed 220 degrees Fahrenheit and the maximum temperature of the steam at 30 pounds per square inch gauge is approximately 250 degrees Fahrenheit. Therefore, low-pressure steam, as a heat source, requires only a minor regulation to prevent scorching or polymerization of the coating material, particularly as compared to other manually portable heat sources such as electrical energy. Thus, low-pressure steam is particularly adapted to the heating of heavily pigmented coating materials prior to spraying as a means of reducing the viscosity of these coating materials to permit applications of thick coats of the materials without slumping.

Coating materials such as lacquers must be applied in such a manner that they provide a smooth coat of substantially uniform thickness. When the coating material is applied cold, that is, at normal room temperature of 60 degrees to 70 degrees Fahrenheit, it is necessary to dilute these coating materials with at least an equal quantity of solvent to permit spraying. This reduces the viscosity of the material to a point suitable for spraying. However, since the coating material has been thinned by the solvent, a series of thin coats must be applied to obtain a film of satisfactory thickness. If it is attempted to apply, as a single coat, the quantity of material involved in these several coats, the result will be unsatisfactory because of slumping, producing undesirable ridges of material. The temperature of the coating material, as sprayed, is substantially the same as the surface upon which it is deposited. Therefore, there is insufficient cooling to heavy up the coating material before it can slump. Further, the rate of vaporization of the solvent is too slow to increase the viscosity before slumping can occur. If, to prevent this slumping, the proportion of solvents is reduced, the viscosity of the coating material increases such that the spray gun is unable to properly atomize the coating material, resulting in blobs and mounds of material being deposited on the surface. Thus, the application of heavy casts of these coating materials at room temperature is limited to an operation consisting of the successive application of a number of thin coats sufficient to accumulate the desired total film thickness.

It is apparent that the solution to this problem lies in decreasing the viscosity of the coating material during the time it is being atomized and actually being deposited on the surface and rapidly increasing this viscosity immediately thereafter. This can best be accomplished by heating the coating material before spraying. The application of heat materially reduces the viscosity of the coating material, thus, the viscosity may be regulated to that satisfactory for spraying without dilution of the coating material with solvents. With the proper application of heat this condition of reduced viscosity will endure through the steps of atomization and deposit. The heated coating material will be sufficiently flowable to form a film of substantially constant thickness on the surface, yet the increase in viscosity after deposit will be sufficiently accelerated to prevent slumping.

This rapid increase in viscosity of the heated coating material results from both cooling of the coating material and evaporation of the solvents. Since the coating material is applied at an elevated temperature, the thermal differential between the coating material and the surface to which it is applied will cause rapid absorption of the coating material's heat by the surface. Since the low viscosity of the coating material is due entirely to heat rather than additional solvents, this cooling will rapidly increase the viscosity of the coating material to substantially that of the undiluted cold coating material. In addition, the elevated temperature of the coating material will cause some of the solvents to vaporize rapidly, further increasing the coating material's viscosity. In practice, the cooling effects the greater portion of the flow stabilization of that portion of the coating material film adjacent the surface being coated and vaporization of the solvents effects the greater portion of the flow stabilization of the exposed surface of the film. This flow stabilization permits the same film thickness of coating material to be applied in a single application as may be applied in several coats when used cold.

Although the heating of coating materials, prior to application, has proved to be a solution for the problem of successfully applying thick coating of the material in a single application, the mechanics by which this is accomplished has remained a major obstacle. The temperature to which coating materials of this type and particularly lacquers may be heated must be held within a relatively narrow, critical range. Above this critical range the heat deteriorates the coating material, and in some cases the volatilization of the solvents becomes so rapid that insufficient flow occurs to obtain a coating of constant thickness. Below this critical range the coating material is too viscous to be properly sprayed and insufficient flow occurs to provide a smooth film. Further, temperatures above the critical range may result in chemical modification of the coating material, rendering it unfit as a coating material.

The problem of maintaining the coating material's temperature within the critical range is complicated by the fact that, normally, the coating materials are intermittently applied. Thus, the number of B. t. u.'s necessary to maintain the coating material within the prescribed temperature limits varies through a wide range. To avoid overheating and underheating under such circumstances, the heating means must be one having a maximum temperature not greatly in excess of the upper limit of the critical range even though the flow of coating material is stopped for an appreciable length of time. At the same time, the heating element must be capable of delivering adequate B. t. u.'s to heat the coating material to temperatures within the critical range even though the sprayer is being used for an indefinite extended period at maximum flow capacity.

Further, the heating of materials containing volatile solvents by means of heating elements having a temperature equal to or above the ignition point of these solvents involves a serious fire hazard. This is true of electrical heating elements, even when they are constructed with the best of spark and hot wire control equipment. Steam or organic fluids having substantially the same specific heat, do not involve this fire hazard. Therefore, all of the fire precautionary equipment necessary with the conventional types of heaters for coating materials may be eliminated by use of our invention.

In our copending application entitled "Instantaneous Coating Material Heating Unit," Serial Number 134,535, filed December 22, 1949, and our application entitled "Coating Material Heating Unit," we have described a coating material heating unit utilizing steam as its source of thermal energy in which overheating is controlled either by predetermined total area of heat exchange surface or a combination of the area of heat exchange surface and evacuation of the heating chamber. Although such designs provide an effective, lightweight heating unit, each unit is limited to a predetermined range of steam pressure. Where it is desired to provide a unit in which the steam pressure may be varied beyond the predetermined narrow limits or to construct a unit in which the total effective heat exchange area is in excess of that by which these temperature limits may be maintained solely by the heat exchange area, it is necessary that other means of thermal regulation be employed. In selecting this additional means of regulation, it is essential that the means be compact, simple and light in weight. By placing a valve in the steam intake line, the operation of which is coordinated to the operation of the spray gun, this regulation may be obtained. Such an arrangement may be designed to be simple and light in weight.

Therefore, it is a primary object of our invention to provide a compact, portable, coating material heating unit in which the quantum of thermal energy delivered to the coating material is coordinated to the intermittent operation of the spray gun.

It is a further object of our invention to provide a lightweight steam flow regulating mechanism.

It is a still further object of our invention to provide a heating unit which cannot scorch the coating material or heat it to its polymerization temperature even though the spray gun is not used for an extended period.

It is an additional object of our invention to provide a steam flow regulating mechanism designed to withstand long and rough usage.

Other objects and purposes of our invention will be immediately seen by those acquainted with the spraying art upon reading the following specification and the accompanying drawings.

Figure 1 is a side elevational view of our valve controlled coating material heating unit.

Figure 2 is a side elevation view of our valve controlled coating material heating unit showing the valve mechanism in central section and removing the shell of the heat exchange element to expose its internal structure and showing the valve in closed position.

Figure 3 is a sectional view of our valve controlled coating material heating unit taken along the plane III—III of Figure 1.

Figure 4 is a fragmentary sectional view of our valve controlled coating material heating unit showing the valve in open position.

Figure 5 is a fragmentary top view of our valve controlled coating material heating unit taken along the plane V—V of Figure 1.

Figure 9:
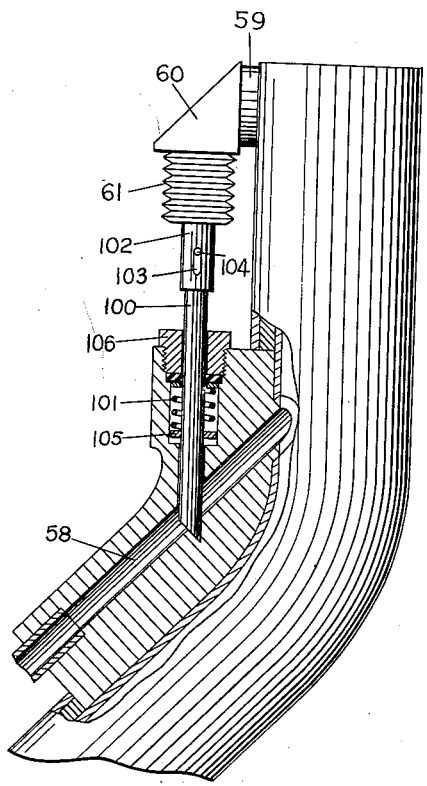
Figure 9 is a fragmentary, broken side elevation view of a further modification of our valve controlled coating material heating unit.

In executing the objects and purposes of our invention, we have provided a coating material heating unit in which the coating material is heated by means of steam. The heating unit is equipped with a valve in the steam supply line to coordinate the flow of steam with the amount of coating material demanded by the spray gun.

I. *Valve operated by spray gun trigger*

Referring to the drawings in greater detail, the numeral 1 indicates a spray gun having a coating material heating unit 2 mounted thereon by means of a bracket 3 and a threaded fitting 4. The heating unit 2 operates as a heat exchanger wherein the coating material is heated by low-pressure steam. The heating unit consists of an inner shell 5 surrounded by a layer of insulation 6 and a protective covering 7. The insulation 6 may be cork, asbestos, or any other suitable insulating material. The covering 7 may be tape, rubber, plastic, or any suitable, wear resistant material for protecting the insulation 6. At each end of and within the inner shell 5 are a pair of spaced baffles 8, defining a first compartment 9 at the inlet end of the heating unit 2 and a second compartment 10 at the outlet end of the heating unit 2. A plurality of tubes 11 extend between and communicate with each of the compartments 9 and 10. The tubes 11, between the compartments 9 and 10, pass through the chamber 12, occupying the central portion of the heating unit 2.

A threaded hose connection 13 communicates with the first compartment 9 and projects outwardly from the heating unit 2 to receive a coating material supply hose 14. A short pipe 15, associated with the threaded fitting 4, communicates with the second compartment 10 and provides means whereby the coating material is conducted from the heating unit 2 to the intake port of the spray gun 1.

Steam is admitted to the chamber 12 by means of the passage 16. The passage 16 is formed by the tube 34 at the intake end and by the valve housing 18 at the discharge end. The tube 34 is mounted on the upper side of the heating unit 2 and extends along the heating unit from the forward or intake end of the heating unit 2 to a point where it enters the valve housing 18. At the discharge end of the passage 16 the valve housing 18 is equipped with an annular projection for carrying the passage 16 into the chamber 12. Adjacent the point where the passage 16 terminates in the chamber 12, a valve 17 is provided in the passage 16. The valve consists of a housing 18 having a central opening 19 extending through it at an angle sharply intersecting the passage 16. The upper portion of the central opening 19 enters a counterbore 20 in which is seated a spring 21.

A valve stem 22 extends concentrically through the counterbore 20 and the central opening 19. The valve stem 22 is of such size that it may seat within the central opening 19 with only sufficient clearance to permit reciprocating sliding movement therethrough without binding. A packing gland 23 surrounds the valve stem 22 and threadedly engages the open end of the counterbore 20. The upper end of the valve stem 22 is equipped with a head 24 rigidly attached to the valve stem. A washer 25, rigidly attached to the valve stem 22, near the bottom of the counterbore 20 when the valve is in closed position, provides a bearing member for one end of the spring 21. The other end of the spring 21 bears against the washer 36.

The valve stem 22, in closed position, passes through the passage 16 to shut off the flow of steam to the chamber 12. The valve 17 is maintained in a closed position by the spring 21 and can be opened only by lifting the valve stem 22 against the urging of the spring 21.

A substantially H-shaped arm 26 is pivotally mounted on the trigger 27 of the spray gun 1 by the pin 28. One of bifurcated ends of the arm 26 embraces the trigger 27. The other bifurcated end of the arm 26 seats around the valve stem 22 between the packing gland 23 and the head 24. The valve stem 22 is loosely engaged by the arm 26 to permit relative movement between the parts as the arm is raised and lowered and to permit the heating unit 2 to be easily removed from the spray gun 1.

As the trigger 27 is moved upwardly from the position shown in Figure 1 to the position shown in Figure 2, the crossbar 29 of the arm 26 engages the end of the trigger 27 limiting further downward movement of the arm 26 relative to the trigger 27. After engagement has been made between the crossbar 29 and the trigger 27, further upward movement of the trigger forces the arm to raise the valve stem 22 to open the valve 17. The movement of the trigger 27 causes the spray gun 1 to operate. Thus, the admission of steam to the chamber 12 is coordinated to the operation of the gun, both being operative or inoperative simultaneously.

To permit entry of a reduced supply of steam to the chamber 12 when the valve 17 is closed, a bypass 32 is provided between the chamber 12 and the passage 16 on the steam supply side of the valve 17. This allows a limited quantity of steam to circumvent the valve 17 at all times. The exhaust steam and condensate are removed from the chamber 12 by the port 30 extending from the chamber 12 through the first compartment 9. An exhaust removal hose 31 is attached to the end of the port 30.

II. Valve operated by thermostat

Figure 6:
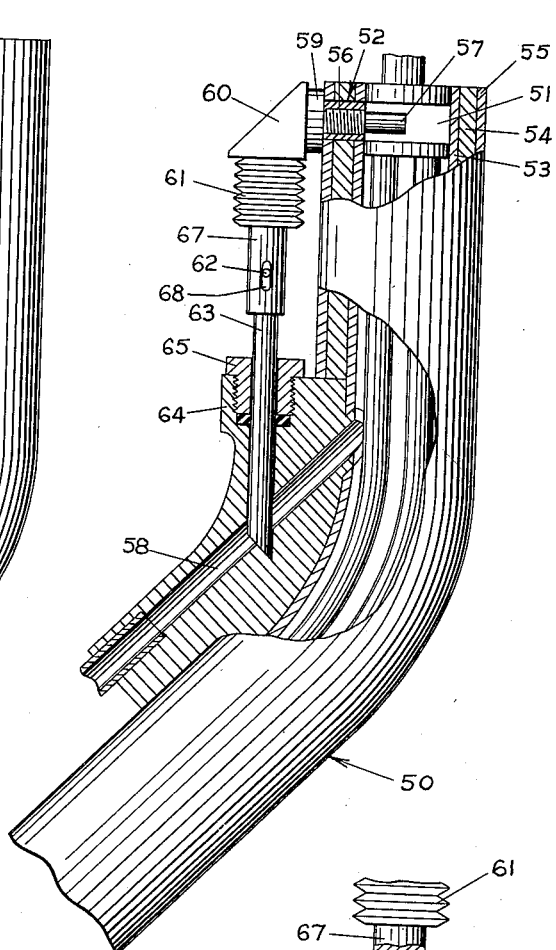
Figure 6 is a fragmentary, partially broken, side elevation of a modification of our valve controlled coating material heating unit.
Figure 8:
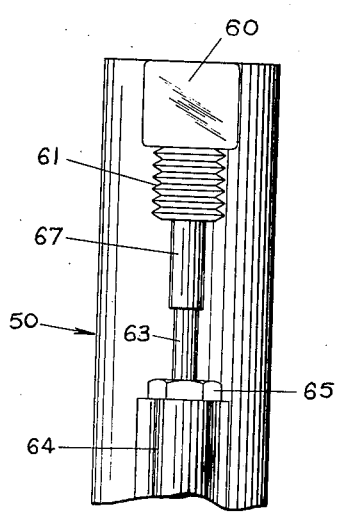
Figure 8 is a fragmentary top view of our modified valve controlled coating material heating unit.
Figure 7:
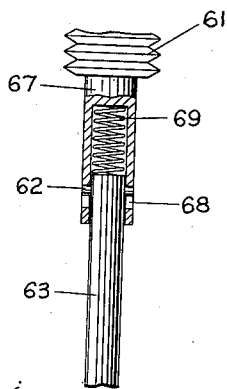
Figure 7 is an enlarged, sectional, fragmentary, side elevation view of the joint between the valve and the thermostat of our modified valve controlled coating material heating unit.

Our valve control heating unit may be constructed to be operated by means of a thermostat (Figures 6, 7, and 8) rather than manually by means of the trigger 27 of the spray gun 1. When the thermostatically controlled valve is employed the heating unit 50, to which the valve is applied, is identical to the heating unit 2 except that the second compartment 51 corresponding to the second compartment 10 of the heating unit 2 is increased in length to accommodate the bulb of the thermostat. An opening 52 extending through the shell 53, insulation 54 and covering 55 communicates with the second compartment 51 and is defined by an internally threaded annular collar 56. The bulb 57 of the thermostat attached to the thermostat base 59 extends an appreciable distance into the second compartment 51. The threaded engagement between the collar 56 and the bulb 57 mounts both the bulb 57 and the base 59. The thermostat housing 60 is mounted on the base 59 and has the bellows 61 of the thermostat extending outwardly therefrom parallel to the heating unit 50. The bulb 57 and the bellows 61 are connected by a small tube or duct of any suitable design through the housing 60 whereby the volatile liquid in the bulb may blow between the bulb and the bellows. The thermostat may be operated by any one of a number of suitable materials having a low boiling point whereby vaporization of the liquid by the heat of the coating material will cause the bellows 61 to expand, thus converting the thermal energy into mechanical energy. The principle and operation of the thermostat is conventional, therefore, its construction need not be described in detail.

By means of the pin 62, the bellows 61 is linked to the valve stem 63. The bellows 61 is provided with a tubular arm 67 for telescopically receiving the end of the valve stem 63. A pair of diametrically opposed slots 68 in the tubular arm 67 receive the ends of the pin 62. A spring 69 (Figure 7) within the tubular arm 67, bearing at one of its ends against the bellows 61 and at the other of its ends against the valve stem 63 maintains the valve stem 63 away from the bellows except when the valve stem is in fully closed position and the bellows 61 expands further than is necessary to close the valve. The spring 69 is of light gauge material and is intended only to keep the valve stem 63 from vibrating axially rather than as a means of forcibly closing the valve as is the purpose of the spring 21. The valve stem 63 is mounted parallel to the adjacent portion of the heating unit 50 and extends into the steam conduit 58 at a sharp angle to the axis of the steam conduit whereby it intersects the steam conduit 58 at a point adjacent the entrance of the steam conduit 58 into the heating unit 50. The steam conduit 58 is provided with a boss 64 surrounding the valve stem 63. The boss 64 is equipped with an internal counterbore whereby it may receive the packing gland 65 surrounding the valve stem 63.

The valve stem may be operated entirely by means of the mechanical motion of the bellows 61 or it may be provided with a spring to positively maintain the valve in one desired position except when urged in the opposite direction by the bellows. Whichever structure is employed is a matter of choice dictated by the circumstances involved in the particular application at hand. In the above described structure such a spring is not utilized and the energy for operating the valve stem is provided entirely by the bellows 61.

When it is desired to maintain the valve in closed position, except when positively urged by the bellows into open position, the spring 101 is used. Such a structure is illustrated in Figure 9 wherein the valve stem 100 is held in normally closed position by the spring 101. The bellows 61 is equipped with a tubular extension 102 for telescopically receiving the end of the valve stem 100. The extension 102 is equipped with a slot 103 for slidably receiving the pin 104 mounted in the valve stem 100. The mounting of the valve stem 100 is substantially similar to the mounting of the valve stem 63. The valve stem 100 is equipped with a shoulder 105 to engage the end of the spring 101. Sealing is obtained by means of the packing gland 106 which packing gland also acts as a retainer for the spring 101.

OPERATION

I. *Valve controlled by spray gun trigger*

Coating material, by means of the supply hose 14, is forced to the heating unit 2 from any suitable source as a bulk supply tank, drum or container. This coating material enters the heating unit 2 at a temperature, usually normal room temperature, at which it can be forced through the supply hose 14 without use of excessive pressures. The coating material enters the first compartment 9 by means of the hose connection 13. Thereafter it flows through the banks of tubes 11 in heat exchange relationship to the steam in the chamber 12. Before the spray gun 1 is initially operated the valve 17 is opened a sufficient length of time to admit enough steam to heat the coating material to a temperature between 110 degrees Fahrenheit and 220 degrees Fahrenheit. When the initial batch of coating material in the heating unit 2 has been properly heated, the spray gun is operated. Moving the trigger 27 to operate the spray gun forces the valve 17 into open position. Thereafter, whenever the trigger 27 is moved to operate the spray gun 1, the valve 17 is opened and when the spraying is stopped the valve 17 shuts off the steam supply. The valve 17 is urged into normally closed position by the spring 21. Thus, only when the coating material is moving through the heating unit 2 at maximum flow is the full heating capacity of the heating unit put into operation. Overheating during nonspraying periods is prevented by substantially shutting off the flow of steam to the chamber 12. The coating material is maintained at an elevated temperature after the valve 17 has been closed by the reduced flow of steam entering the chamber by means of the bypass 32.

The design of the arm 26 provides a simple but positive mechanical link between the trigger 27 and the valve stem 22. Since the arm 26 has only a pivoted linkage to the trigger 27 as the trigger 27 moves to closed or "off" position, it is impossible for the arm to restrain the closing action of the trigger. Further, in inoperative position both the trigger 27 and the valve stem 22 are free to independently effect a tight closing action.

II. *Valve operated by thermostat*

The bulb 57 extends into the hot side of the heating unit 50 since it is mounted in the second compartment 51. As the temperature of the coating material entering the second compartment 51 increases, the liquid within the bulb 57 will vaporize causing the bellows 61 to expand. This, in turn, will force the valve stem 63 across the steam conduit 58 shutting off the steam. As the temperature of the coating material starts to decrease due to the cessation of the steam flow, the bellows 61 will contract causing the valve stem 63 to open the steam conduit 58. Thus, the temperature of the coating material may be regulated within a narrow predetermined thermal range. When the coating material is steadily flowing through the heating unit, the temperature in the second compartment 51 will be lower, thus, causing the valve stem 63 to be held in at least partially open, or retracted, position substantially all of the time.

The temperature at which the bellows 61 will function to initiate shutting off the steam supply may be regulated by the choice of liquid used to actuate the bellows. A number of liquids are available, each having a different boiling point, and, thus, a different temperature operating range. The same regulations may be effected by the length of slots 68 or 103. The greater the length of the slot the greater the temperature range within which the bellows 61 may move without effecting movement of the valve stem 63 or 100.

In this manner the temperature of the coating material may be maintained within limits of 110 degrees Fahrenheit and 220 degrees Fahrenheit. That this thermal range be maintained is important because below 110 degrees Fahrenheit the coating material will tend to slump after spraying. Above 220 degrees Fahrenheit the coating material is in danger of either scorching or polymerizing, depending upon the type of coating material involved, particularly if temperatures in this range persist for any substantial period of time. The temperature limits of 110 degrees and 220 degrees Fahrenheit define the broad range of operating temperatures. The preferred limits are between 125 degrees and 190 degrees Fahrenheit and the optimum operating range is between 135 degrees and 165 degrees Fahrenheit. Under all normal operating conditions, our heating unit, equipped with a steam regulating valve coordinated with the operation of the spray gun, is capable of maintaining the coating material between 125 degrees and 190 degrees Fahrenheit.

A steam energized heating unit, equipped with the above-described steam flow regulator valve, eliminates the necessity of designing each heating unit with a particular area of heat exchange surface. Thus, a larger heating unit may be used under circumstances in which only a small quantity of coating material will be needed or steam at a higher pressure may be employed. By coordinating the steam flow regulation to the thermal demands of the spray gun, a simple, yet positively controlled, heating unit is provided. Further, such a heating unit lends itself to simple construction whereby the heating mechanism and the thermal control mechanism may both be mounted upon the spray gun without unduly increasing the spray gun's weight or making it awkward to manipulate.

Since our coating material heating unit is designed to heat only the stream of coating material actually flowing toward the spray gun rather than the bulk supply of coating material the capacity of the thermal energy source may be greatly reduced. Since the quantity of coating material to be heated, at any one time, is small, the coating material responds rapidly to variations in the quantity of heat energy supplied. Thus, it is possible to regulate the coating material's temperature within the preferred range of 125 degrees to 190 degrees Fahrenheit by means of a simple mechanism capable of being mounted upon a spray gun where it may directly and positively be coordinated to the operation of the spray gun.

When the spring loaded valve stem 100 is used, the valve is held in normally closed position by the spring 101. The valve will remain closed until the contraction of the bellows 61 overcomes the pressure of the spring 101 to open the valve. Thus, the spring will dampen the fluctuations of the valve stem 100 and the variations in the temperature of the coating material will be somewhat greater than that experienced when the valve is operated entirely by the mechanical action of the bellows.

When the valve is thermostatically controlled the use of a steam bypass, such as the bypass 32, used in connection with the trigger controlled valve, is not essential because the thermostat will respond to the temperature of the coating material to maintain it within a predetermined range. It may be used, however, where circumstances dictate its utility.

The object of heating the coating material is to temporarily reduce its viscosity while it is being deposited on the surface being coated, and, thereafter, to rapidly increase its viscosity to prevent excessive flow. By heating the coating material to 110 degrees Fahrenheit or more, the viscosity of the coating material is materially reduced. The rate of viscosity reduction is greater in the range between 60 degrees and 125 degrees Fahrenheit than between 125 degrees and 190 degrees Fahrenheit. Within the range of 125 degrees to 190 degrees Fahrenheit a portion of the solvents, especially those having a low boiling point, will volatilize substantially immediately after deposit of the film of coating material. The coating material, although having a sufficiently low viscosity at the nozzle of the spray gun to permit thorough atomization, rapidly increases its viscosity due to rapid cooling and volatilization of the solvents.

By the application of heat, the viscosity of the coating material is reduced to a point where the coating material is suitable for spraying without the addition of further solvents. As the film of material forms on the surface being coated it cools rapidly by heat transfer due to the large thermal differential between the heated coating material and the surface. The cooling is sufficiently rapid to thicken the material before it can slump and form ridges. Sufficient flow occurs, however, to permit formation of a film of substantially constant thickness. This cooling affects primarily that portion of the film adjacent to the surface being coated. Flow and slumping of the exposed surface of the film is controlled by evaporation of some of the heated solvents. Since, in this manner, a coating material of high viscosity, at room temperature, may be applied to a surface and its flow regulated, it is possible to apply, in a single coat, the same quantity of heated coating material which can only be applied by the use of several coats of cold coating material. This is true since it becomes unnecessary to dilute the coating material with solvents.

It is important that our heating unit is designed primarily to be operated with relatively low pressure steam, i. e., steam having a pressure range of 1 to 30 pounds per square inch gauge. Such pressures do not require heavy, pressure-resisting structures. Further, the maximum temperatures of such low pressure steam is not greatly in excess of the maximum permissible temperature of 220 degrees Fahrenheit for the coating materials. At the same time low pressure steam is capable of delivering large quantities of B. t. u.'s to effect rapid heating of the coating material. It is capable of doing this, even though controlled by only simple regulatory means, without endangering the coating material immediately adjacent the heat exchange surfaces by overheating.

Modifications may be made in the exact structure employed to carry out the principle of our invention; however, each of such modifications are to be considered as included within the following appended claims, unless said claims by their language expressly provide otherwise.

We claim:

1. In a heating unit associated with a spray gun for heating a coating material prior to spraying, the improvement in said heating unit comprising: a housing oblong in cross section having a curved contour around the trigger portion of said spray gun enclosing therein a heat exchange element, said heat exchange element having a coating material flow capacity equal to the maximum instantaneous coating material demand of said spray gun; a first conduit for admitting steam to said heat exchange element; a second conduit for continuously exhausting steam and condensate from said heat exchange element and to a remotely positioned heat supply reservoir; means for passing said coating material through said heat exchange element in heat exchange relationship to said steam; a valve in said first conduit; means for opening and closing said valve in coordination with the movement of said coating material through said heat exchange element, said valve being integrated with the heat exchange element by attachment to the inner shell of said heat exchange element; and the whole heating unit attached to the spray gun by a bracket.

2. In a heating unit for heating a coating material to a predetermined temperature range between 125 degrees and 190 degrees Fahrenheit prior to spraying, the improvement in said heating unit comprising: a housing oblong in cross section havin a curved contour around the trigger portion of said spray gun enclosing therein a heat exchange element; a first conduit for admitting steam to said heat exchange element; a second conduit for continuously exhausting steam and condensate from said heat exchange element and to a remotely positioned heat supply reservoir; means for passing said coating material through said heat exchange element in heat exchange relationship to said steam; a valve in said first conduit; means for opening and closing said valve in coordination with the movement of said coating material through said heat exchange element for maintaining said coating material within the predetermined temperature range of 125 to 190 degrees Fahrenheit, said valve being integrated with the heat exchange element by attachment to the inner shell of said heat exchange element; and the whole heating unit attached to the spray gun by a bracket.

3. In a heating unit mounted upon a spray gun having a trigger, said unit adapted for heating a coating material prior to spraying, said heating unit comprising: a housing defining an enclosed central chamber; a first pipe for conducting steam into said chamber; a second pipe for conducting excess steam and condensate out of said chamber; tubular means within said chamber for passing said coating material through said chamber in heat exchange relationship to said steam; a valve in said first pipe for controlling steam flow; resilient means for urging said valve into closed position; an arm having one of its ends engaging said valve and the other of its ends engaging said trigger for urging said valve to move in unison with said trigger whereby when said trigger is moved in a manner to cause said spray gun to operate said arm moves said valve to open position said valve being integrated with the heat exchange element by attachment to the inner shell of said heat exchange element; and the whole heating unit attached to the spray gun by a bracket.

4. In a heating unit mounted upon a spray gun having a trigger, said unit adapted for heating a coating material prior to spraying, said heating unit comprising: a housing enclosing therein a heat exchange element; a first conduit for admitting steam to said heat exchange element; a second conduit for exhausting steam and condensate from said heat exchange element; means for flowing said coating material through the said heat exchange element in heat exchange relationship to said steam; a valve in said first conduit; including a valve stem and means resiliently urging said valve stem into normally closed position; a head on one end of said valve stem; an arm bifurcated on each of its ends and having a crossbar separating said bifurcated ends; one end of said arm embracing and pivotally mounted to said trigger; the other end of said arm embracing said valve stem and engaging said head; said crossbar engaging said trigger as said trigger is moved in a manner to operate said spray gun whereby said arm and valve stem are urged to move with said trigger for opening said valve; means for supporting said heating unit on said spray gun.

5. In a heating element as described in claim 4 wherein a bypass conduit is provided between said first conduit and said heat exchange element; said bypass conduit communicating with said first conduit on the side of said valve remote from said heat exchange element.

6. In a heating unit mounted upon a spray gun having a trigger, said unit adapted for heating a coating material prior to spraying, said heating unit comprising: a housing enclosing therein a heat exchange element; a first conduit for admitting steam to said heat exchange element; a second conduit for exhausting steam and condensate from said heat exchange element; means for passing said coating material through said heat exchange element in heat exchange relationship to said steam; a valve in said conduit for controlling the flow of steam into said heat exchange element, said valve resiliently urged into a normally closed position; lever means engaging both said trigger and said valve for opening said valve simultaneously with movement of said trigger to spray gun operating position said valve being integrated with the heat exchange element by attachment to the inner shell of said heat exchange element; and the whole heating unit attached to the spray gun by a bracket.

7. In a heating unit associated with a spray gun for heating a coating material prior to spraying, said heating unit comprising: a housing oblong in cross section having a curved contour around the trigger portion of said spray gun enclosing therein a heat exchange element, said heat exchange element having a coating material flow capacity equal to the maximum instantaneous coating material demand of said spray gun; a first conduit for admitting steam to said heat exchange element; a second conduit for continuously exhausting steam and condensate from said heat exchange element and to a remotely positioned heat supply reservoir; means for flowing said coating material through said heat exchange element in heat exchange relationship to said steam; a valve in said conduit for controlling the flow of steam into said heat exchange element; a thermostat having its heat sensitive element mounted in the coating material discharge end of said heating unit; means mounted on said thermostat for opening and closing said valve.

8. A heating unit as described in claim 7, wherein said thermostat includes a bellows and said means mounted on said thermostat is mounted on said bellows and includes a tubular element telescopically receiving one end of said valve; the walls of said tubular element defining a slot parallel to the direction of movement of said bellows; a pin in said valve slidably seated within said slot; a spring within said tubular element for urging said valve away from said bellows whereby said bellows may have limited movement while said valve is stationary.

CHARLES B. LANSING.
EDWARD G. HART.

References Cited in the file of this patent

UNITED STATES PATENTS

| Number | Name | Date |
| --- | --- | --- |
| 945,505 | Fess | Jan. 4, 1910 |
| 1,457,634 | Neri | June 5, 1923 |
| 1,758,984 | Stricker | May 20, 1930 |
| 1,998,776 | Collins | Apr. 23, 1935 |
| 2,148,986 | Hoyt | Feb. 28, 1939 |
| 2,366,150 | Yount | Dec. 26, 1944 |
| 2,401,504 | Paasche | June 4, 1946 |
| 2,434,911 | Denyssen | Jan. 27, 1948 |
| 2,499,448 | Axelson et al. | Mar. 7, 1950 |

FOREIGN PATENTS

| Number | Country | Date |
| --- | --- | --- |
| 87,109 | Switzerland | Nov. 1, 1920 |